R. H. WAINFORD.
SCOURING APPARATUS.
APPLICATION FILED JAN. 26, 1909.

953,450.

Patented Mar. 29, 1910.
4 SHEETS—SHEET 1.

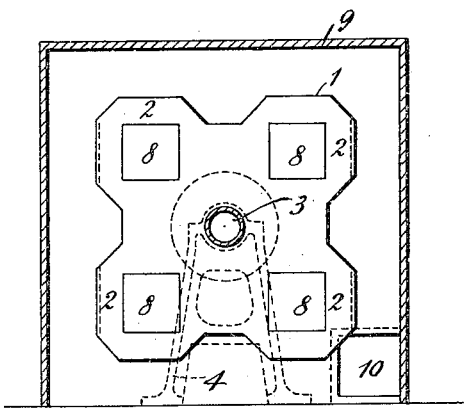
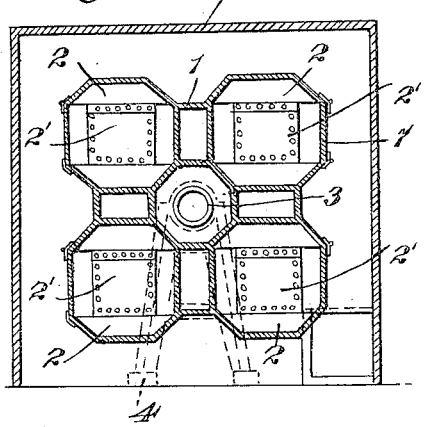
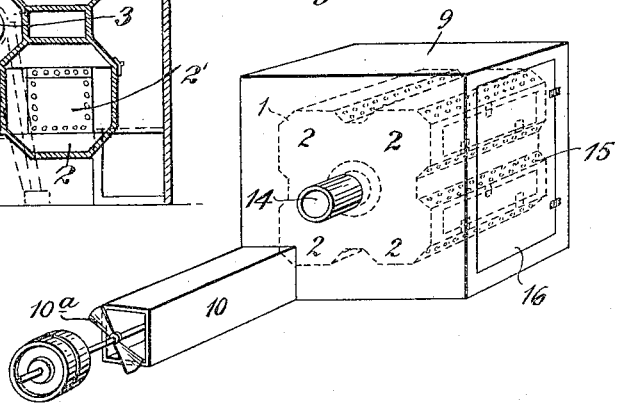

R. H. WAINFORD.
SCOURING APPARATUS.
APPLICATION FILED JAN. 26, 1909.

953,450.

Patented Mar. 29, 1910.
4 SHEETS—SHEET 3.

Witnesses.—

Inventor.—
R. H. Wainford

R. H. WAINFORD.
SCOURING APPARATUS.
APPLICATION FILED JAN. 26, 1909.
953,450.
Patented Mar. 29, 1910.
4 SHEETS—SHEET 4.
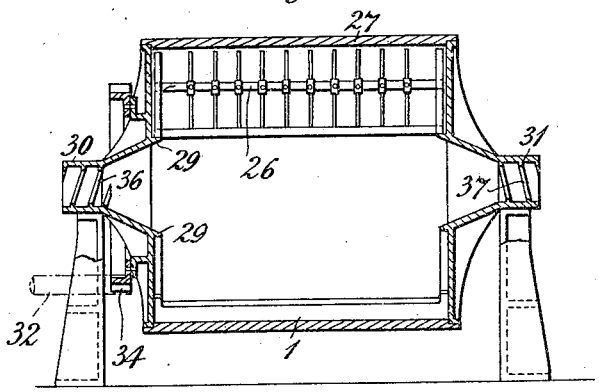
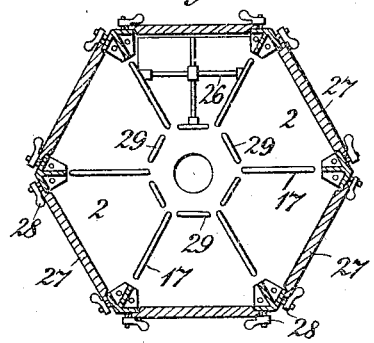 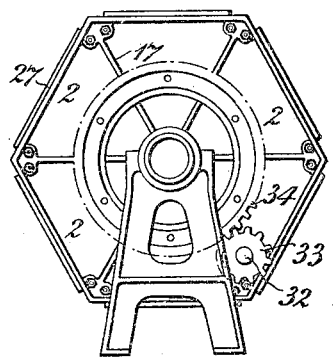
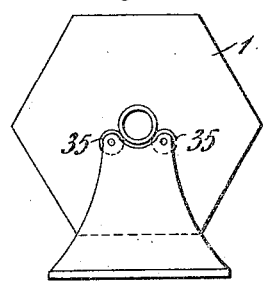  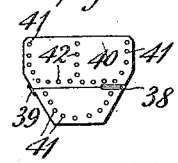
Witnesses.
M. E. Loury
O. M. Philpott
Inventor.
R. H. Wainford
By M. H. Everett & Co. attys

UNITED STATES PATENT OFFICE.

RICHARD HANBURY WAINFORD, OF NEWCASTLE-UNDER-LYME, ENGLAND.

SCOURING APPARATUS.

953,450.  Specification of Letters Patent. Patented Mar. 29, 1910.

Application filed January 26, 1909. Serial No. 474,278.

*To all whom it may concern:*

Be it known that I, RICHARD HANBURY WAINFORD, subject of His Majesty the King of Great Britain and Ireland, residing at 3 Belgrave road, Newcastle-under-Lyme, in the county of Stafford, England, have invented certain new and useful Improvements in Scouring Apparatus, of which the following is a specification, reference being had therein to the accompanying drawings.

In using scouring apparatus, comprising a rotatable drum the internal cavity of which is adapted to receive the articles under treatment together with scouring, grinding, or polishing material that, by the rotation of the drum, is forcibly projected or showered against these articles, which are contained in and held in position by open cages within the drum, it is sometimes advantageous to separate one or more of the chambers or recesses in the drum from the others by boarding or plate partitions, and to introduce into such separate compartments a portion of the scouring medium, which consequently has not so far to fall as it has when contained within a larger compartment, with the result that articles of a more delicate nature may be scoured with less risk of injury.

Now this invention has for object the construction of apparatus of the kind above referred to wherein the drum contains separate compartments each containing its own scouring material. Apparatus for this purpose may be variously arranged.

Figure 1:
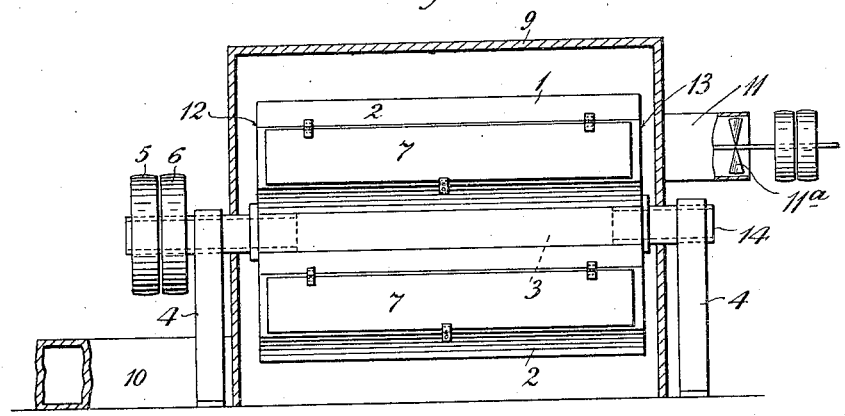
Figure 2:
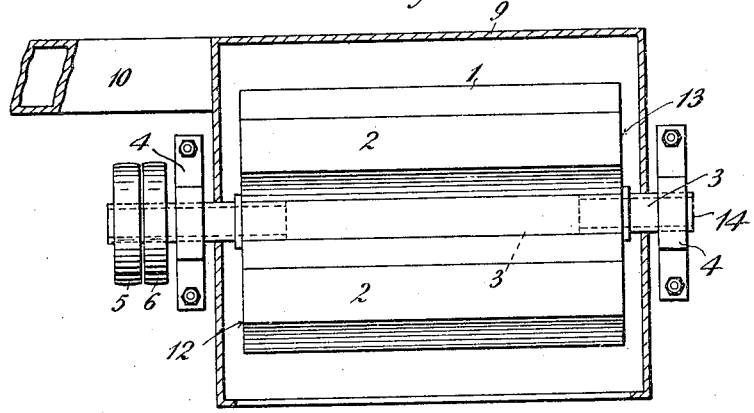
Figure 5:
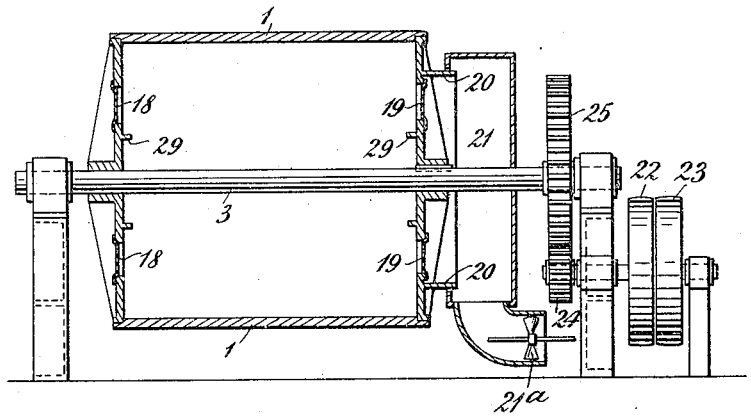
Figure 6:
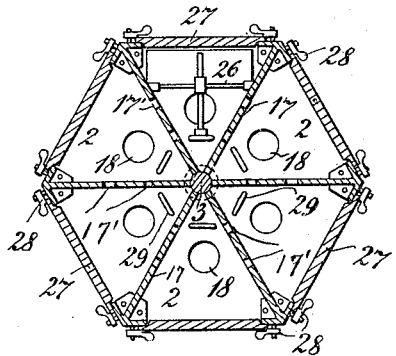

Figure 1 represents a side elevation partly in section; Fig. 2 a plan partly in section, and Fig. 3 an end view partly in section of one example of apparatus according to my invention; Fig. 4 is a perspective view of a slightly modified construction of the same; Figs. 5 and 6 illustrate respectively in longitudinal and in transverse section a further modification thereof; Figs. 7, 8 and 9 show respectively in longitudinal section, in transverse section and in end elevation a further modified construction; Fig. 10 illustrates an alternative constructional detail; Figs. 11 and 12 show respectively in side and end elevation a cage suitable for the reception of hollow ware of various sizes. Fig. 13 is a cross sectional view of Fig. 1.

In the apparatus shown in Figs. 1, 2 and 3 of the accompanying drawings the drum 1 comprises four polygonal compartments 2 arranged around a central hollow shaft 3 journaled in standards 4 and furnished with fast and loose pulleys 5 and 6. The articles to be scoured and hot water and soap or other washing or scouring material are placed within the compartments 2, the articles being supported and held apart within the compartments by means of removable skeleton cages, the articles being inserted and removed through doors or removable covers 7 in the sides of the compartments, as shown in Fig. 1. When skeleton cages are employed for the reception of the articles, these may be inserted into and withdrawn from the compartments of the drum either through the lateral doors 7, or through doors or covers 8 in the end of the drum, as shown in Fig. 3.

The drum 1 is mounted to rotate within a stationary air-tight hood 9 furnished with an air inlet duct 10 and an air outlet 11; and the ends of the compartments have inlet and outlet screen grids or ports 12, 13, formed, it may be, by perforations in the doors 8, already mentioned. An air blast may be produced by any suitable pressure or exhaust device, an exhaust fan $11^a$ being generally used.

According to the modification shown in Fig. 4, the air current enters the drum compartments through their perforated sides 15 and passes through similarly perforated sides within the compartments to a central air outlet duct communicating with the hollow shaft 14. The perforations, while large enough to allow air and dust to pass, are too fine to admit of the escape through them of scouring material. A door 16 is provided in the hood to admit of access to the drum. The air blast in this construction is produced by a pressure fan $10^a$.

The arrangement shown in Figs. 5 and 6 comprises a polygonal drum 1 divided by radial partitions 17 into compartments 2 each furnished with one or more air inlet grids or ports 18 communicating directly with the atmosphere, and air outlet grids or ports 19 communicating with a ring 20 cast on the outlet end of the drum 1 and rotating in a circular aperture in the wall of an air conduit 21 leading to an exhaust fan $21^a$. The drum may be driven by means of a drive shaft having fast and loose pulleys 22, 23, either directly or through gearing 24, 25. The cages 26 are in this example of apparatus inserted and removed through the sides 27 of the drum, which are formed as covers and preferably provided with clamping screws 28. Within the drum there are provided concentrically disposed supports 29 for the cages 26; as shown, these supports consist of projections on the ends of the drum, but they may obviously consist of bars extending throughout its length. To facilitate recharging of the drum and to enable the charged cages to be re-inserted into their compartments, the partitions 17 are preferably formed with apertures 17' through which, as the drum is slowed down, the scouring material descends from its upper to its lower compartments.

In the construction of apparatus shown in Figs. 7 to 9, the drum 1, which is of hexagonal form, is furnished with six compartments 2 for the reception of cages 26. In this construction, as in that last described, the cages are inserted in the drum through removable covers 27 furnished with clamping screws 28. The air current enters and leaves the drum through hollow shafts 30, 31 respectively. The drum 1 is in this example rotated from a driving shaft 32 through a pinion 33 thereon gearing with a toothed ring 34 secured on the end of the drum. The shafts 30, 31, instead of being journaled in bearings and caps such as shown in Fig. 9, may each be mounted on a pair of rollers 35 as shown in Fig. 10.

Instead of passing through grids or ports the air current may be passed through right and left hand worms or conveyer screws 36, 37 in the hollow trunnions. This arrangement possesses the advantage that any grit that may project or splash into the air inlet or outlet is returned to the drum, the air current being only of sufficient strength to carry the dust away; and it is especially suitable for use in the treatment of heavy ware and castings, in which the abrading material employed would be so heavy that the covers having ports or grids would be likely to be injured thereby.

Figs. 11 and 12 illustrate an arrangement of cage 26 suitable for the reception of hollow ware of various sizes. This cage is divided lengthwise, its upper forming a cover for its lower half. These halves may be connected together by hinges 38 and fastenings 39, and are provided with transverse partitions 40 arranged at various distances apart to suit different kinds of ware. The partitions 40 are connected by side bars 41, and there are doweled into them internal bars 42 that may be inserted for the support of smaller ware, or removed to make way for larger, as may be convenient. The connections 38, 39, may be dispensed with, the two halves of the cage being kept in position by the walls of its compartment 2. This arrangement of cage is especially suitable for small scourers, or for large scourers designed mainly for the scouring of the smaller sizes of ware.

The apparatus hereinbefore described is suitable for scouring, and polishing and also for washing goods such as earthenware, clothes and the like; for the former purpose the drum may be supplied with pitcher or rough sand, while for the latter purpose it would contain soda solution, hot water and soap, or the like, and the air blast would be dispensed with.

What I claim is:—

1. In scouring apparatus the combination of a rotatable drum, partitions arranged within said drum whereby the internal cavity of said drum is divided into compartments each adapted to contain scouring or cleansing material, covers arranged in the outer walls of said compartments to afford access thereto for the insertion and removal of articles, an air-tight hood for the drum, air circulating means connected therewith and means for rotating said drum.

2. In scouring apparatus the combination of a rotatable drum, partitions arranged within said drum whereby the internal cavity of said drum is divided into compartments each adapted to contain scouring or cleansing material, a removable cage in each compartment adapted to receive articles to be scoured or cleansed, covers arranged in the outer walls of said compartments to afford access thereto for the insertion and removal of articles and cages, an air-tight hood for the drum, air circulating means connected therewith and means for rotating said drum.

3. In scouring apparatus the combination of a rotatable drum, a stationary air-tight hood inclosing said drum, partitions arranged within said drum whereby the internal cavity of said drum is divided into compartments each adapted to contain scouring or cleansing material, covers arranged in the outer walls of said compartments to afford access thereto for the insertion and removal of articles, and means for rotating said drum.

4. In scouring apparatus the combination of a rotatable drum, a stationary airtight hood inclosing said drum, an air inlet trunk and an air outlet trunk communicating with said hood, means for passing an air blast through said trunks and hood, partitions arranged within said drum whereby the internal cavity of said drum is divided into compartments each adapted to contain scouring or cleansing material, a removable cage in each compartment adapted to receive articles to be scoured or cleansed, covers arranged in the outer walls of said compartments to afford access thereto for the insertion and removal of articles and cages, and means for rotating said drum.

5. In a scouring apparatus, the combination of a rotatable drum, partitions arranged within said drum for dividing the same into compartments, a removable cage located in each of the compartments, hollow shafts for the ends of the drum, conveyer screws located in the hollow shafts, and means for rotating the drum.

In testimony whereof I affix my signature in the presence of two witnesses.

RICHARD HANBURY WAINFORD.

Witnesses:
    HARRY CAUSTON,
    WILLIAM THOMAS CONNELLY.